(12) United States Patent
Capati et al.

(10) Patent No.: US 8,763,090 B2
(45) Date of Patent: Jun. 24, 2014

(54) MANAGEMENT OF ANCILLARY CONTENT DELIVERY AND PRESENTATION

(75) Inventors: Allister Capati, San Francisco, CA (US); Ennin Huang, Fremont, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 665 days.

(21) Appl. No.: 12/782,678

(22) Filed: May 18, 2010

(65) Prior Publication Data

US 2011/0041161 A1    Feb. 17, 2011

Related U.S. Application Data

(60) Provisional application No. 61/233,019, filed on Aug. 11, 2009.

(51) Int. Cl.
| | |
|---|---|
| H04L 29/00 | (2006.01) |
| G06F 21/00 | (2013.01) |
| G06F 15/16 | (2006.01) |
| G06F 17/00 | (2006.01) |
| G06F 17/30 | (2006.01) |
| G06F 9/44 | (2006.01) |

(52) U.S. Cl.
CPC ............... *G06F 21/00* (2013.01); *G06F 15/16* (2013.01); *G06F 17/00* (2013.01); *G06F 17/30* (2013.01); *G06F 8/71* (2013.01)
USPC .................................................. 726/4; 725/3

(58) Field of Classification Search
CPC ......... G06F 15/16; G06F 71/78; G06F 17/00; G06F 17/30
USPC ................................................ 726/4; 725/23
See application file for complete search history.

(56) References Cited

U.S. PATENT DOCUMENTS

| | | | |
|---|---|---|---|
| 4,521,021 | A | 6/1985 | Dixon |
| 4,542,897 | A | 9/1985 | Melton et al. |

(Continued)

FOREIGN PATENT DOCUMENTS

| | | |
|---|---|---|
| AU | 9959097 | 11/1999 |
| CA | 2106122 | 3/1994 |

(Continued)

OTHER PUBLICATIONS

Fontijn, Willem; AmbientDB: P2P Data Management Middleware for Ambient Intelliegence; Year: 2004; IEEE; pp. 1-5.

(Continued)

*Primary Examiner* — Brandon Hoffman
*Assistant Examiner* — Michael D Anderson
(74) *Attorney, Agent, or Firm* — Lewis Roca Rothgerber LLP

(57) ABSTRACT

Embodiments of the present invention address delivery of content, including advertising, in an online or networked digital environment. Undesirable content or content that needs to be removed from the digital environment may be eliminated through invocation of a 'kill switch' that terminates further delivery of the aforementioned content. The 'kill switch' may also eliminate certain instantiations of that content already delivered to end-user client devices. In order to lessen the need for termination of content following delivery to the digital environment, content developers and content providers may view content scheduled for delivery in digital environment 'mock ups' prior to actual delivery. Content developers and content providers, too, may control certain attributes related to content scheduled for delivery to further obviate post-delivery termination or modification.

22 Claims, 5 Drawing Sheets

(56) References Cited

U.S. PATENT DOCUMENTS

| | | | |
|---|---|---|---|
| 4,734,690 | A | 3/1988 | Waller |
| 4,807,158 | A | 2/1989 | Blanton et al. |
| 4,905,168 | A | 2/1990 | McCarthy et al. |
| 4,926,255 | A | 5/1990 | Von Kohorn |
| 4,969,036 | A | 11/1990 | Bhanu et al. |
| 5,014,234 | A | 5/1991 | Edwards, Jr. |
| 5,083,271 | A | 1/1992 | Thacher et al. |
| 5,105,184 | A | 4/1992 | Pirani et al. |
| 5,227,874 | A | 7/1993 | Von Kohorn |
| 5,231,568 | A | 7/1993 | Cohen et al. |
| 5,283,731 | A | 2/1994 | Lalonde et al. |
| 5,305,195 | A | 4/1994 | Murphy |
| 5,305,389 | A | 4/1994 | Palmer |
| 5,319,454 | A | 6/1994 | Schutte |
| 5,347,632 | A | 9/1994 | Filepp et al. |
| 5,373,440 | A | 12/1994 | Cohen et al. |
| 5,377,997 | A | 1/1995 | Wilden et al. |
| 5,446,919 | A | 8/1995 | Wilkins |
| 5,462,275 | A | 10/1995 | Lowe et al. |
| 5,497,479 | A | 3/1996 | Hornbuckle |
| 5,512,935 | A | 4/1996 | Majeti et al. |
| 5,526,041 | A | 6/1996 | Glatt |
| 5,539,450 | A | 7/1996 | Handelman |
| 5,548,645 | A | 8/1996 | Ananda |
| 5,564,038 | A | 10/1996 | Grantz et al. |
| 5,565,909 | A | 10/1996 | Thibadeau et al. |
| 5,572,643 | A | 11/1996 | Judson |
| 5,592,212 | A | 1/1997 | Handelman |
| 5,630,757 | A | 5/1997 | Gagin et al. |
| 5,636,346 | A | 6/1997 | Saxe |
| 5,663,757 | A | 9/1997 | Morales |
| 5,669,497 | A | 9/1997 | Evans et al. |
| 5,684,526 | A | 11/1997 | Yoshinobu |
| 5,697,844 | A | 12/1997 | Von Kohorn |
| 5,699,497 | A | 12/1997 | Erdahl et al. |
| 5,707,289 | A | 1/1998 | Watanabe et al. |
| 5,712,979 | A | 1/1998 | Graber et al. |
| 5,721,827 | A | 2/1998 | Logan et al. |
| 5,724,521 | A | 3/1998 | Dedrick |
| 5,734,619 | A | 3/1998 | Numata et al. |
| 5,737,619 | A | 4/1998 | Judson |
| 5,748,867 | A | 5/1998 | Cosman et al. |
| 5,751,956 | A | 5/1998 | Kirsch |
| 5,758,068 | A | 5/1998 | Brandt et al. |
| 5,758,257 | A | 5/1998 | Herz et al. |
| 5,771,347 | A | 6/1998 | Grantz et al. |
| 5,774,170 | A | 6/1998 | Hite et al. |
| 5,794,210 | A | 8/1998 | Goldhaber et al. |
| 5,798,519 | A | 8/1998 | Vock et al. |
| 5,805,815 | A | 9/1998 | Hill |
| 5,822,523 | A | 10/1998 | Rothschild et al. |
| 5,848,396 | A | 12/1998 | Gerace |
| 5,855,008 | A | 12/1998 | Goldhaber et al. |
| 5,857,149 | A | 1/1999 | Suzuki |
| 5,860,073 | A | 1/1999 | Ferrel et al. |
| 5,867,208 | A | 2/1999 | McLaren |
| 5,876,286 | A | 3/1999 | Lee |
| 5,879,235 | A | 3/1999 | Kaneko et al. |
| 5,903,816 | A | 5/1999 | Broadwin et al. |
| 5,910,987 | A | 6/1999 | Ginter et al. |
| 5,911,582 | A | 6/1999 | Redford |
| 5,916,024 | A | 6/1999 | Von Kohorn |
| 5,917,725 | A | 6/1999 | Thacher et al. |
| 5,929,850 | A | 7/1999 | Broadwin et al. |
| 5,937,037 | A | 8/1999 | Kamel et al. |
| 5,946,646 | A | 8/1999 | Schena et al. |
| 5,946,664 | A | 8/1999 | Ebisawa |
| 5,948,061 | A | 9/1999 | Merriman et al. |
| 5,964,660 | A | 10/1999 | James et al. |
| 5,964,664 | A | 10/1999 | Cook et al. |
| 5,970,143 | A | 10/1999 | Schneier et al. |
| 5,974,398 | A | 10/1999 | Hanson et al. |
| 5,987,511 | A | 11/1999 | Elixmann et al. |
| 5,991,735 | A | 11/1999 | Gerace |
| 6,005,602 | A | 12/1999 | Matthews, III |
| 6,012,984 | A | 1/2000 | Roseman |
| 6,015,348 | A | 1/2000 | Lambright et al. |
| 6,020,883 | A | 2/2000 | Herz et al. |
| 6,024,643 | A | 2/2000 | Begis |
| 6,026,368 | A | 2/2000 | Brown et al. |
| 6,029,046 | A | 2/2000 | Khan et al. |
| 6,036,601 | A | 3/2000 | Heckel |
| 6,047,289 | A | 4/2000 | Thorne et al. |
| 6,088,722 | A | 7/2000 | Herz et al. |
| 6,108,637 | A | 8/2000 | Blumenau |
| 6,113,494 | A | 9/2000 | Lennert |
| 6,119,098 | A | 9/2000 | Guyot et al. |
| 6,149,519 | A | 11/2000 | Osaki et al. |
| 6,151,631 | A | 11/2000 | Ansell et al. |
| 6,165,070 | A | 12/2000 | Nolte et al. |
| 6,179,713 | B1 | 1/2001 | James et al. |
| 6,181,988 | B1 | 1/2001 | Schneider et al. |
| 6,196,920 | B1 | 3/2001 | Spaur et al. |
| 6,199,082 | B1 | 3/2001 | Ferrel et al. |
| 6,216,129 | B1 | 4/2001 | Eldering |
| 6,236,975 | B1 | 5/2001 | Boe et al. |
| 6,238,290 | B1 | 5/2001 | Tarr et al. |
| 6,251,017 | B1 | 6/2001 | Leason et al. |
| 6,263,360 | B1 | 7/2001 | Arnold et al. |
| 6,264,555 | B1 | 7/2001 | Glazman et al. |
| 6,264,560 | B1 | 7/2001 | Goldberg et al. |
| 6,267,672 | B1 | 7/2001 | Vance |
| 6,267,675 | B1 | 7/2001 | Lee |
| 6,275,854 | B1 | 8/2001 | Himmel et al. |
| 6,275,989 | B1 | 8/2001 | Broadwin et al. |
| 6,298,348 | B1 | 10/2001 | Eldering |
| 6,308,328 | B1 | 10/2001 | Bowcutt et al. |
| 6,312,337 | B1 | 11/2001 | Edwards et al. |
| 6,320,495 | B1 | 11/2001 | Sporgis |
| 6,324,519 | B1 | 11/2001 | Eldering |
| 6,343,990 | B1 | 2/2002 | Rasmussen et al. |
| 6,346,045 | B2 | 2/2002 | Rider et al. |
| 6,366,701 | B1 | 4/2002 | Chalom et al. |
| 6,371,850 | B1 | 4/2002 | Sonoda |
| 6,379,251 | B1 | 4/2002 | Auxier et al. |
| 6,381,362 | B1 | 4/2002 | Deshpande et al. |
| 6,385,592 | B1 | 5/2002 | Angles et al. |
| 6,390,922 | B1 | 5/2002 | Vange et al. |
| 6,393,574 | B1 | 5/2002 | Kashiwagi et al. |
| 6,394,899 | B1 | 5/2002 | Walker |
| 6,400,996 | B1 | 6/2002 | Hoffberg et al. |
| 6,411,936 | B1 | 6/2002 | Sanders |
| 6,434,614 | B1 | 8/2002 | Blumenau |
| 6,443,843 | B1 | 9/2002 | Walker et al. |
| 6,446,130 | B1 | 9/2002 | Grapes |
| 6,446,261 | B1 | 9/2002 | Rosser |
| 6,456,234 | B1 | 9/2002 | Johnson |
| 6,457,010 | B1 | 9/2002 | Eldering et al. |
| 6,460,036 | B1 | 10/2002 | Herz |
| 6,468,155 | B1 | 10/2002 | Zucker et al. |
| 6,470,138 | B1 | 10/2002 | Um et al. |
| 6,484,148 | B1 | 11/2002 | Boyd |
| 6,484,149 | B1 | 11/2002 | Jammes et al. |
| 6,489,955 | B1 | 12/2002 | Newhall, Jr. |
| 6,496,826 | B1 | 12/2002 | Chowdhury et al. |
| 6,513,160 | B2 | 1/2003 | Dureau |
| 6,516,338 | B1 | 2/2003 | Landsman et al. |
| 6,529,940 | B1 | 3/2003 | Humble |
| 6,530,840 | B1 | 3/2003 | Cuomo et al. |
| 6,532,448 | B1 | 3/2003 | Higginson et al. |
| 6,539,375 | B2 | 3/2003 | Kawasaki |
| 6,539,544 | B2 | 3/2003 | Ebisawa |
| 6,553,178 | B2 | 4/2003 | Abecassis |
| 6,560,578 | B2 | 5/2003 | Eldering |
| 6,563,523 | B1 | 5/2003 | Suchocki et al. |
| 6,564,217 | B2 | 5/2003 | Bunney et al. |
| 6,595,859 | B2 | 7/2003 | Lynn |
| 6,606,746 | B1 | 8/2003 | Zdepski et al. |
| 6,611,813 | B1 | 8/2003 | Bratton |
| 6,611,957 | B2 | 8/2003 | Ebisawa |
| 6,612,932 | B2 | 9/2003 | Stern |
| 6,615,039 | B1 | 9/2003 | Eldering |
| 6,616,533 | B1 | 9/2003 | Rashkovskiy |
| 6,625,578 | B2 | 9/2003 | Spaur et al. |

(56) References Cited

U.S. PATENT DOCUMENTS

| | | |
|---|---|---|
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Petermeier et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 7,707,485 B2 | 4/2010 | Laksono |
| 8,005,713 B1 | 8/2011 | Sanz-Pastor et al. |
| 8,024,766 B2 | 9/2011 | Addington |
| 8,074,076 B2 | 12/2011 | Courtois |
| 8,175,921 B1 | 5/2012 | Kopra |
| 8,191,088 B2 * | 5/2012 | Edwards et al. ............ 725/23 |
| 8,267,783 B2 | 9/2012 | van Datta |
| 8,272,964 B2 | 9/2012 | van Datta |
| 8,302,030 B2 | 10/2012 | Soroca et al. |
| 8,574,074 B2 | 11/2013 | van Datta et al. |
| 8,626,584 B2 | 1/2014 | van Datta et al. |
| 8,645,992 B2 | 2/2014 | Russell |
| 8,676,900 B2 | 3/2014 | Yruski |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0004810 A1 | 1/2002 | Reneris |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0021465 A1 | 2/2002 | Moore, Jr. et al. |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0078441 A1 | 6/2002 | Drake et al. |
| 2002/0082077 A1 | 6/2002 | Johnson et al. |

(56) References Cited

U.S. PATENT DOCUMENTS

| | | |
|---|---|---|
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0164977 A1 | 11/2002 | Link II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0185825 A1 | 12/2002 | Miyamoto et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2002/0195837 A1 | 12/2002 | Warwel et al. |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110171 A1 | 6/2003 | Ozer et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0148625 A1 | 8/2003 | Ho et al. |
| 2003/0149618 A1 | 8/2003 | Sender et al. |
| 2003/0149623 A1 | 8/2003 | Chen |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |

(56) References Cited

U.S. PATENT DOCUMENTS

| | | |
|---|---|---|
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0057348 A1 | 3/2004 | Shteyn et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1 | 8/2004 | Bennington et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Schrock et al. |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0125528 A1 | 6/2005 | Burke et al. |
| 2005/0130725 A1 | 6/2005 | Creamer et al. |
| 2005/0143174 A1 | 6/2005 | Goldman et al. |

(56) References Cited

U.S. PATENT DOCUMENTS

| | | |
|---|---|---|
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0202385 A1 | 9/2005 | Coward et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0007312 A1 | 1/2006 | James |
| 2006/0031551 A1 | 2/2006 | Agresta et al. |
| 2006/0085517 A1 | 4/2006 | Kaurila |
| 2006/0085816 A1 | 4/2006 | Funk et al. |
| 2006/0090186 A1 | 4/2006 | Santangelo et al. |
| 2006/0130095 A1 | 6/2006 | Willis et al. |
| 2006/0143650 A1 | 6/2006 | Tanikawa et al. |
| 2006/0150249 A1 | 7/2006 | Gassen et al. |
| 2006/0167747 A1 | 7/2006 | Goodman |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0195902 A1 | 8/2006 | King et al. |
| 2006/0212347 A1 | 9/2006 | Fang et al. |
| 2006/0212350 A1 | 9/2006 | Ellis et al. |
| 2006/0230141 A1 | 10/2006 | Willis |
| 2006/0242667 A1 | 10/2006 | Petersen et al. |
| 2006/0242703 A1 | 10/2006 | Abeni |
| 2006/0248209 A1 | 11/2006 | Chiu et al. |
| 2006/0253323 A1 | 11/2006 | Phan et al. |
| 2006/0253330 A1 | 11/2006 | Maggio et al. |
| 2006/0265503 A1 | 11/2006 | Jones et al. |
| 2006/0268667 A1 | 11/2006 | Jellison, Jr. et al. |
| 2006/0294566 A1 | 12/2006 | Zlattner |
| 2007/0027771 A1 | 2/2007 | Collins et al. |
| 2007/0038508 A1 | 2/2007 | Jain et al. |
| 2007/0038516 A1 | 2/2007 | Apple et al. |
| 2007/0038931 A1 | 2/2007 | Allaire et al. |
| 2007/0050254 A1 | 3/2007 | Driscoll |
| 2007/0055980 A1 | 3/2007 | Megeid et al. |
| 2007/0061204 A1 | 3/2007 | Ellis et al. |
| 2007/0061838 A1 | 3/2007 | Grubbs et al. |
| 2007/0066287 A1 | 3/2007 | Papulov |
| 2007/0073756 A1 | 3/2007 | Manhas et al. |
| 2007/0078706 A1 | 4/2007 | van Datta |
| 2007/0078712 A1 | 4/2007 | Ott et al. |
| 2007/0078714 A1 | 4/2007 | Ott |
| 2007/0078989 A1 | 4/2007 | van Datta |
| 2007/0079326 A1 | 4/2007 | van Datta |
| 2007/0079331 A1 | 4/2007 | van Datta |
| 2007/0079335 A1 | 4/2007 | McDonough |
| 2007/0083611 A1 | 4/2007 | Farago et al. |
| 2007/0089151 A1 | 4/2007 | Moore et al. |
| 2007/0094081 A1 | 4/2007 | Yruski |
| 2007/0094082 A1 | 4/2007 | Yruski |
| 2007/0094083 A1 | 4/2007 | Yruski |
| 2007/0094363 A1 | 4/2007 | Yruski |
| 2007/0101360 A1 | 5/2007 | Gutta et al. |
| 2007/0118425 A1 | 5/2007 | Yruski |
| 2007/0130012 A1 | 6/2007 | Yruski |
| 2007/0130594 A1 | 6/2007 | Hidary et al. |
| 2007/0146812 A1 | 6/2007 | Lawton |
| 2007/0150919 A1 | 6/2007 | Morishita |
| 2007/0162945 A1 | 7/2007 | Mills |
| 2007/0174471 A1 | 7/2007 | Van Rossum |
| 2007/0244760 A1 | 10/2007 | Bodnar et al. |
| 2007/0294740 A1 | 12/2007 | Drake et al. |
| 2007/0299935 A1 | 12/2007 | Plastina et al. |
| 2008/0046948 A1 | 2/2008 | Verosub |
| 2008/0097872 A1 | 4/2008 | Peckover |
| 2008/0104106 A1 | 5/2008 | Rosenberg et al. |
| 2008/0109844 A1 | 5/2008 | Baldeschwieler et al. |
| 2008/0127244 A1 | 5/2008 | Zhang |
| 2008/0140239 A1 | 6/2008 | Rosenberg et al. |
| 2008/0140717 A1 | 6/2008 | Rosenberg et al. |
| 2008/0141372 A1 | 6/2008 | Massey et al. |
| 2008/0207137 A1 | 8/2008 | Maharajh et al. |
| 2009/0083788 A1 | 3/2009 | Russell |
| 2009/0183081 A1 | 7/2009 | Rodriguez |
| 2009/0204481 A1 | 8/2009 | Navar et al. |
| 2010/0022310 A1 | 1/2010 | van Datta |
| 2010/0030640 A1 | 2/2010 | van Datta |
| 2010/0043022 A1 | 2/2010 | Kaftan |
| 2010/0169910 A1 | 7/2010 | Collins et al. |
| 2010/0269138 A1 | 10/2010 | Krikorian et al. |
| 2011/0004669 A1 | 1/2011 | Navar |
| 2011/0010545 A1 | 1/2011 | Kill et al. |
| 2011/0015975 A1 | 1/2011 | Yruski et al. |
| 2011/0029383 A1 | 2/2011 | Engel et al. |
| 2011/0125582 A1 | 5/2011 | van Datta |
| 2011/0307339 A1 | 12/2011 | Russell et al. |
| 2013/0232000 A1 | 9/2013 | van Datta |
| 2013/0232001 A1 | 9/2013 | van Datta |
| 2013/0297411 A1 | 11/2013 | van Datta |
| 2014/0019229 A1 | 1/2014 | van Datta |
| 2014/0089081 A1 | 3/2014 | Yruski |

FOREIGN PATENT DOCUMENTS

| | | |
|---|---|---|
| EP | 0 337 539 | 10/1989 |
| EP | 0 405 776 | 1/1991 |
| EP | 0 620 688 | 10/1994 |
| EP | 0 625 760 | 11/1994 |
| EP | 0 743 595 | 10/1996 |
| EP | 0 905 928 | 3/1999 |
| GB | 2 141 907 | 1/1985 |
| GB | 2 194 369 | 3/1988 |
| JP | 12-20925 | 9/1989 |
| JP | 63-35569 | 12/1994 |

(56) References Cited

FOREIGN PATENT DOCUMENTS

| | | |
|---|---|---|
| JP | 81-17445 | 5/1996 |
| JP | 81-73634 | 7/1996 |
| JP | 82-80934 | 10/1996 |
| JP | 2001-111921 | 4/2001 |
| JP | 2001-321556 | 11/2001 |
| JP | 2002-259433 | 9/2002 |
| JP | 2002-358455 | 12/2002 |
| JP | 2002-366971 | 12/2002 |
| JP | 2003-248844 | 9/2003 |
| JP | 2004-298469 | 10/2004 |
| WO | WO 93/14462 | 7/1993 |
| WO | WO 93/22017 | 11/1993 |
| WO | WO 93/23125 | 11/1993 |
| WO | WO 95/12442 | 5/1995 |
| WO | WO 95/12853 | 5/1995 |
| WO | WO 98/51384 | 11/1998 |
| WO | WO 03/032127 | 4/2003 |
| WO | WO 2004/100010 | 11/2004 |
| WO | WO 2005/086969 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

U.S. Appl. No. 13/939,178 Office Action mailed Oct. 10, 2013.
U.S. Appl. No. 11/240,655 Final Office Action mailed Nov. 14, 2013.
U.S. Appl. No. 13/191,398 Office Action mailed Dec. 3, 2013.
U.S. Appl. No. 11/452,848 Office Action mailed Nov. 18, 2013.
U.S. Appl. No. 14/028,327 Office Action mailed Nov. 7, 2013.
U.S. Appl. No. 11/586,990 Office Action mailed Nov. 20, 2013.
U.S. Appl. No. 11/586,958 Office Action mailed Nov. 6, 2013.
U.S. Appl. No. 11/586,958 Final Office Action mailed Feb. 14, 2011.
U.S. Appl. No. 11/586,958 Office Action mailed Sep. 30, 2010.
U.S. Appl. No. 12/703,188 Office Action mailed Nov. 21, 2013.
Andreaux. J.-P.; Copy Protection system for digital home networks; Mar. 2004; IEEE, vol. 21, Issue: 2; pp. 100-108.
Business Wire, "Juno launches America's first free Internet e-mail service; Initial advertisers include Land's End, Miramax and Snapple," Apr. 19, 1996.
Business Wire, "Rtime Announces First 100-Person Twitch Game for Internet; "RTIME Rocks!" Demonstrates the Power of the RTIME Interactive Networking Engine to Support Large Scale, High Performance, Internet Game Play," Apr. 14, 1997.
Cohen, Josh, "A General Overview of Two New Technologies for Playing Protected Content on Portable or Networked Devices," Microsoft Windows Media, Jun. 2004, 1-8.
Courtois N. et al: An Algebraic Masking Method to Protect AES Agaist Power Attacks, 'Online! XP002344150 Retrieved from the Internet: URL:eprint.iacr.org/2005/204.pdf> 'retrieved on Sep. 8, 2005.
Microsoft Corporation, "A Technical Overview of Windows Media DRM 10 for Devices," Microsoft Windows Media, Sep. 2004, 1-16.
Microsoft Corporation, "Architecture of Windows Media Rights Manager," www.microsoft.com/windows/windowsmedia/howto/articles/drmarchitecture.aspc, May 2004.
PricewaterhouseCoopers, "Lab Online Ad Measurement Study," Dec. 2001.
Recording Industry Association of America, "Frequently Asked Questions—Webcasting," www.riaa.com/issues/licensing/webcasting_faq.asp. (acc. 2004).
Statement in Accordance with the Notice from the European Patent Office dated Oct. 1, 2007 Concerning Business Methods Nov. 1, 2007, XP002456252.
U.S. Copyright Office, "The Digital Millennium Copyright Act of 1998," Oct. 1998, 1-18.
What TV Ratings Really Mean (and Other Frequently-Asked Questions). Nielsen Media Research. Web. <http:!/ documents. chelmsford. k 12. ma.us/dsweb/GeUDocument-14983/ nielsenmedia.htm>, Jun. 2005.
PCT/US06/037018, International Search Report and Written Opinion mailed Aug. 7, 2007.
PCT/US06/036958, International Search Report and Written Opinion mailed Apr. 27, 2007.
PCT/US07/11059, International Search Report and Written Opinion mailed May 30, 2008.
EP 06815173.7, Extended European Search Report mailed Oct. 5, 2011.
JP 2009-509786, Decision of Refusal mailed Oct. 30, 2012.
JP 2009-509786, Decision of Refusal mailed Aug. 2, 2011.
JP 2009-509786, Decision of Refusal mailed Jul. 28, 2011.
CN 200780016268.2, First Office Action mailed Jan. 4, 2012.
EP 07776856.2, Extedned European Search Report mailed Jun. 9, 2011.
U.S. Appl. No. 11/241,229 Final Office Action mailed Apr. 23, 2010.
U.S. Appl. No. 11/241,229 Office Action mailed Nov. 19, 2009.
U.S. Appl. No. 12/571,204 Office Action mailed Feb. 28, 2012.
U.S. Appl. No. 12/571,225 Office Action mailed Feb. 2, 2012.
U.S. Appl. No. 11/240,655 Office Action mailed Aug. 5, 2013.
U.S. Appl. No. 11/240,655 Final Office Action mailed Jan. 27, 2010.
U.S. Appl. No. 11/240,655 Office Action mailed Apr. 16, 2009.
U.S. Appl. No. 12/190,323 Final Office Action mailed Feb. 25, 2013.
U.S. Appl. No. 12/190,323 Office Action mailed May 7, 2012.
U.S. Appl. No. 12/190,323 Office Action mailed Jun. 8, 2011.
U.S. Appl. No. 12/190,323 Final Office Action mailed Nov. 14, 2011.
U.S. Appl. No. 13/191,398 Final Office Action mailed Jun. 7, 2013.
U.S. Appl. No. 13/191,398 Office Action mailed Mar. 22, 2013.
U.S. Appl. No. 11/535,370 Final Office Action mailed Jun. 8, 2010.
U.S. Appl. No. 11/535,307 Office Action mailed Dec. 10, 2009.
U.S. Appl. No. 11/535,307 Final Action mailed Sep. 8, 2009.
U.S. Appl. No. 11/535,307 Office Action mailed Apr. 16, 2009.
U.S. Appl. No. 13/013,789 Final Office Action mailed Feb. 27, 2013.
U.S. Appl. No. 13/013,789 Office Action mailed Oct. 9, 2012.
U.S. Appl. No. 11/452,848 Final Office Action mailed Feb. 15, 2011.
U.S. Appl. No. 11/452,848 Office Action mailed Sep. 15, 2010.
U.S. Appl. No. 11/452,848 Final Office Action mailed Apr. 21, 2010.
U.S. Appl. No. 11/452,848 Office Action mailed Oct. 20, 2009.
U.S. Appl. No. 11/452,848 Final Office Action mailed Jul. 9, 2009.
U.S. Appl. No. 11/452,848 Office Action mailed Jan. 27, 2009.
U.S. Appl. No. 11/586,990 Final Office Action mailed Apr. 10, 2013.
U.S. Appl. No. 11/586,990 Office Action mailed Nov. 23, 2012.
U.S. Appl. No. 11/586,990 Final Office Action mailed Feb. 14, 2011.
U.S. Appl. No. 11/586,990 Office Action mailed Sep. 15, 2010.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Office Action mailed Mar. 18, 2011.
U.S. Appl. No. 11/586,958 Office Action mailed Sep. 1, 2010.
U.S. Appl. No. 11/586,958 Office Action mailed Dec. 11, 2009.
U.S. Appl. No. 11/586,989 Final Office Action mailed Dec. 9, 2010.
U.S. Appl. No. 11/586,989 Office Action mailed May 11, 2010.
U.S. Appl. No. 11/586,989 Office Action mailed Mar. 30, 2009.
U.S. Appl. No. 11/586,959 Final Office Action mailed Aug. 30, 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/370,531 Office Action mailed Aug. 1, 2013.
U.S. Appl. No. 12/370,531 Final Office Action mailed Apr. 3, 2011.
U.S. Appl. No. 12/370,531 Office Action mailed Nov. 16, 2011.
U.S. Appl. No. 12/370,531 Final Office Action mailed Aug. 1, 2011.
U.S. Appl. No. 12/370,531 Office Action mailed Feb. 2, 2011.
U.S. Appl. No. 11/588,236 Office Action mailed Sep. 9, 2009.
U.S. Appl. No. 11/588,236 Office Action mailed Mar. 5, 2009.
U.S. Appl. No. 12/703,188 Final Office Action mailed Oct. 12, 2012.
U.S. Appl. No. 12/703,188 Office Action mailed Apr 6, 2012.
U.S. Appl. No. 10/924,009 Supplemental Final Office Action mailed Feb. 4, 2009.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 31, 2012.

(56) References Cited

OTHER PUBLICATIONS

U.S. Appl. No. 12/717,108 Final Office Action mailed Jul. 20, 2011.
U.S. Appl. No. 12/717,108 Office Action mailed Feb. 9, 2011.
JP 2013-039681, Notification of Reason for Refusal mailed Feb. 12, 2014.
U.S. Appl. No. 13/013,789 Office Action mailed Dec. 20, 2013.
U.S. Appl. No. 11/588,036 Office Action mailed Jan. 6, 2014.
U.S. Appl. No. 11/586,959 Office Action mailed Feb. 12, 2014.
U.S. Appl. No. 11/586,958 Final Office Action mailed Mar. 12, 2014.
US 8,689,348, 04/2014, Navar (withdrawn)

* cited by examiner

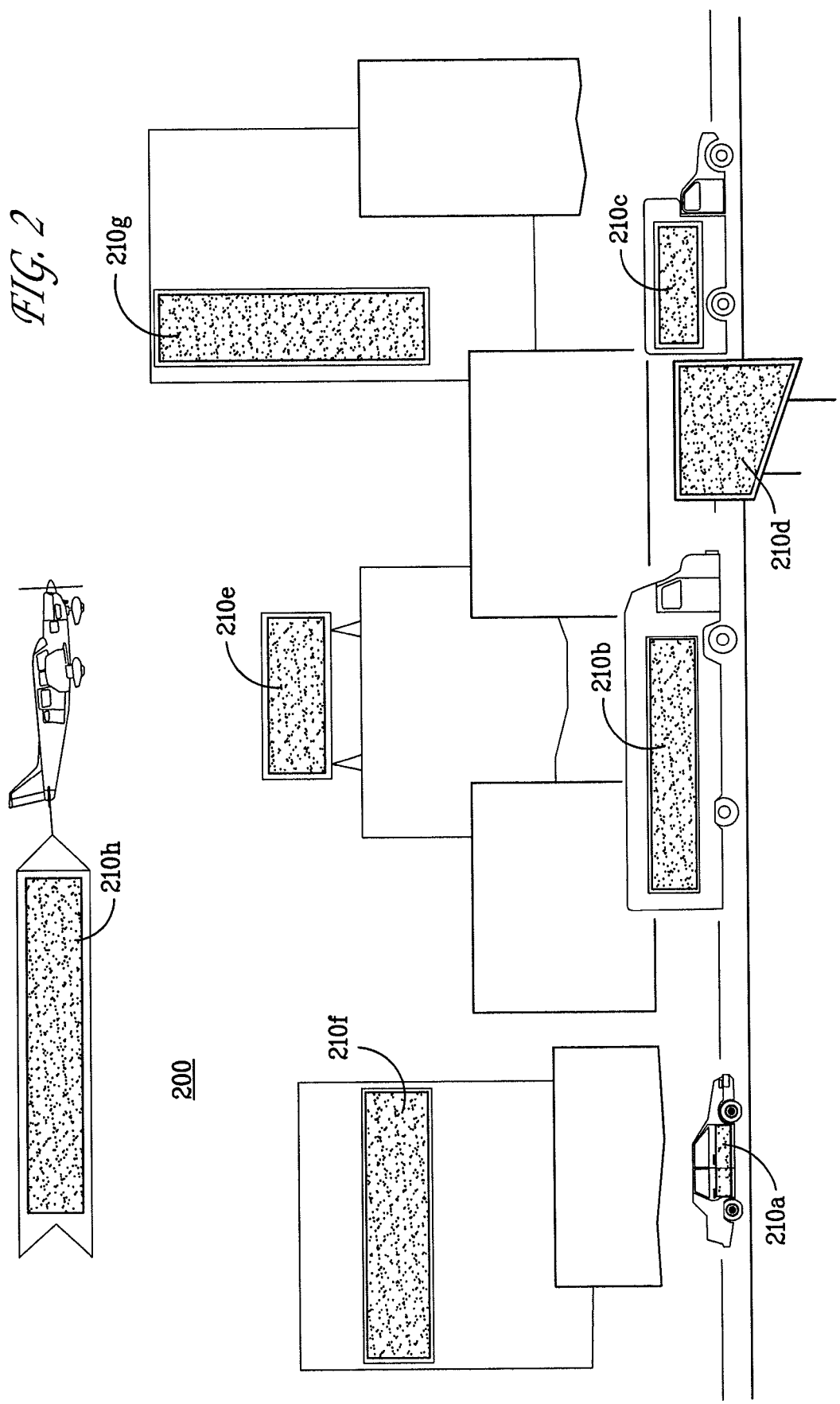

MANAGEMENT OF ANCILLARY CONTENT DELIVERY AND PRESENTATION

CROSS-REFERENCE TO RELATED APPLICATIONS

This application claims the priority benefit of U.S. provisional patent application 61/233,019 filed Aug. 11, 2009 and titled "Management of Ancillary Content Delivery and Presentation," the disclosure of which is incorporated herein by reference.

BACKGROUND OF THE INVENTION

1. Field of the Invention

The present invention generally relates to online content delivery. More specifically, the present invention relates to managing delivery of ancillary content in a digital environment, including the termination of content delivery as well as the pre-delivery preview and control.

2. Description of the Related Art

Content delivery is increasingly network or online based whereby a user accesses a service provider over a communications network via an end-user client device. The service provider then delivers content to the end-user client device via a network connection. In many instances, this content includes music, movies, and video game content for either live, on-line game play or static single player engagement. Delivered content may be entirely on-line based (e.g., a streamed or downloaded movie) or may be delivered in conjunction with a traditional storage medium such as a DVD or CD. An end-user client device may execute, for example, a video game from a DVD and request certain portions of the video game from the service provider such as updated game information, including levels and in-game content. Content such as interviews, bonus performance, lyrics, or album information may be similarly retrieved with respect to music and video content otherwise maintained in a more traditional storage medium.

In many instances, the content delivered by the service provider concerns ancillary content such as 'bonus' content or advertisements that are related, but not critical to enjoyment of the primary content such as the video game or music video. The primary content is often developed, refined, and edited over the course of several months or years before it is delivered to the end-user. Because of this long development cycle, the primary content often represents a finished and polished final product. In many instances, the ancillary content is developed 'spur of the moment' to correspond with cultural trends, recent events, or then existing consumer demand. The ancillary content is often time sensitive and does not experience the same degree of development, refinement, and editing as the corresponding primary content.

Because of the shortened development cycle, ancillary content may often suffer from a number of developmental defects. These defects include delivery of content that might suggest a proper combination with primary content in the conceptual phase, but often proves to be less than ideal in terms of actual delivery and presentation. For example, an advertisement for a video game for survival in a post-nuclear-apocalypse game might 'sound good' in development, but be difficult to discern or understand when placed into a corresponding game environment where it is actually encountered by end-users. As such, there is a need in the art to better understand the appearance and control the interaction and integration of certain ancillary content in a digital environment.

Of perhaps even greater concern is when ancillary content is delivered for insertion into primary content and the ancillary content proves to be offensive or sometimes illegal in a particular community or jurisdiction. For example, energy drinks are popular throughout many parts of the world. A particular brand of energy drink is banned in France, Denmark, and Norway, however, due to perceived high levels of caffeine and other stimulants. France also bans other certain vitamin-fortified foods including certain brands of yogurt and cereal. Notwithstanding what might be an otherwise mundane or run-of-the-mill advertising campaign for any one of those products, the very proffering of that product for purchase may in fact violate laws of a particular country. As such, there is a need to remove certain offensive or illegal content from a digital environment.

BRIEF DESCRIPTION OF THE DRAWINGS

FIG. 2 illustrates a digital video game environment allowing for placement of a variety of advertisements.

DETAILED DESCRIPTION

Embodiments of the present invention address delivery of content, including advertising, in an online or networked digital environment. Undesirable content or content that needs to be removed from the digital environment may be eliminated through invocation of a 'kill switch' that terminates further delivery of the aforementioned content. The 'kill switch' may also eliminate certain instantiations of that content already delivered to end-user client devices. In order to lessen the need for termination of content following delivery to the digital environment, content developers and content providers may view content scheduled for delivery in digital environment 'mock ups' prior to actual delivery. Content developers and content providers, too, may control certain attributes related to content scheduled for delivery to further obviate post-delivery termination or modification.

Figure 1:
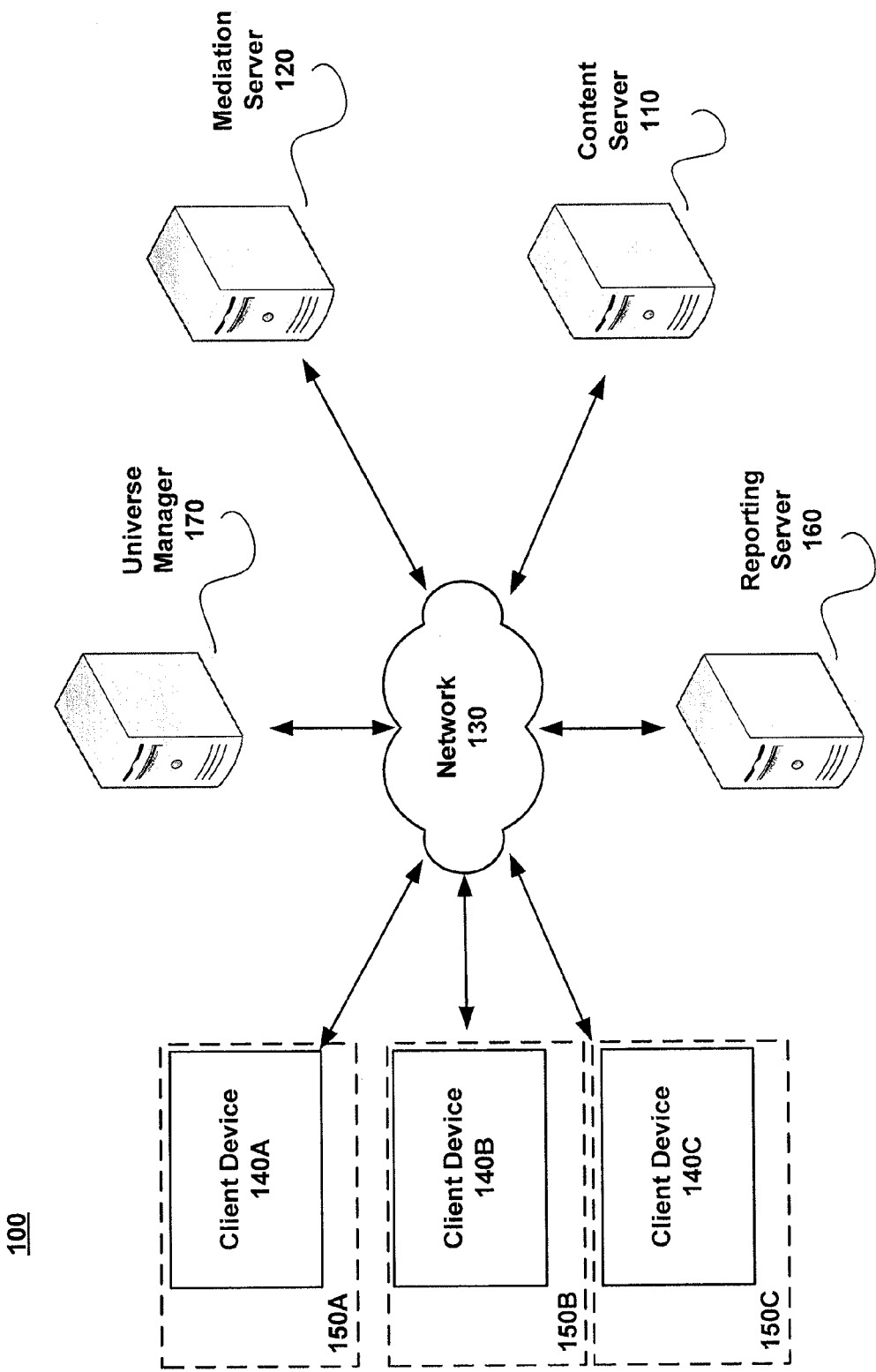
FIG. 1 illustrates a networked digital environment through which ancillary content, including advertisements, may be delivered to end-users.

FIG. 1 illustrates a networked digital environment 100 through which ancillary content, including advertisements, may be delivered to end-users. The digital environment 100 of FIG. 1 illustrates a content server 110 and mediation server 120, both of which are communicatively coupled to a communications network 130. The digital environment 100 also includes various end-user client devices 140A . . . C, which may communicate with the content server 110 and mediation server 120 over network 130. The digital environment 100 may also include a reporting server 160 as well as a universe manager 170. End-user client devices 140A . . . C may also be organized into regions, zones, or some other cognizable classification (150A . . . C).

Content server 110 hosts and distributes content over network 130. Content server 110 includes standard computing components such as network and media interfaces, computer-readable storage (memory), and processors for executing instructions that may be stored in memory. Content server 110 delivers various types of content to end-user client devices 140A . . . C. Examples of content are media such as music and movies as well as video game content (e.g., game downloaded over a network as well as live, networked games), which may sometimes be referred to as primary content.

Content is further inclusive of ancillary content such as advertising and/or content to be embedded within primary content. For example, an end-user client device 140A may be executing a video game (primary content), which may be downloaded over a network or from a computer-readable storage medium executed by the end-user client device 140A (e.g., a DVD). During execution of the video game, certain flags, identifiers, tags, or markers may be present in the game data indicating the need to insert ancillary content such as advertising into a particular asset or object within the game. Following negotiations with mediation server 120, the end-user client device 140A may contact content server 110 over communications network 130 to download the ancillary content. Content server 110 then provides the requested content to the end-user client device 140A for insertion into the appropriate portion or asset of the video game environment as is otherwise indicated by the aforementioned flags, tags, identifiers, or markers.

FIG. 2 illustrates a digital video game environment 200—a cityscape—allowing for placement of a variety of ancillary content, including advertisements. The cityscape game environment 200 may reflect any number of objects and structures as may be found in a city environment such as buildings, vehicles, and roadways. Certain objects may also appear in the video game environment 200 surrounding the city, such as airplanes and the like. While a cityscape is depicted in FIG. 2, any number of different video game environments may be utilized within the scope of the present invention including a race-track and grandstands or a sports arena or stadium.

In the case of the cityscape of FIG. 2, part of the realism of the digital video game environment 200 is attributed to various types of signage, specifically advertisements, trade names, and trademarks or corporate logos (collectively referred to as advertisements) that indicate the source or quality of certain goods and/or services. Various structures in the video game environment 200 of FIG. 2 exhibit numerous types of signage and advertisements 210*a* . . . h.

For example, advertisement 210*a* is an advertisement as may be found on the side of a taxi-cab. The advertisement may be the taxi-cab company name and phone number or for a particular good or service in the region serviced by the taxi-cab (e.g., a night club). Advertisement 210*b* is an advertisement as may be found on the side of a bus, which may be for the local newspaper, a local radio show, or an upcoming movie. Advertisement 210*c* is found on the side of an industrial vehicle and may be for a particular shipping company (e.g., a moving company) or for the name of the company whose cargo is being shipped (e.g., a furniture company).

Advertisements may also be on billboards as in the case of advertisements 210*d* and 210*e*. Such billboards may be alongside a road (like advertisement 210*d*) or may be atop a building (like advertisement 210*e*). Any variety of goods or services may be found on such billboards as is the case in the real world. Signage and related advertisements and indicia of sponsorship or ownership may also be found on the face of a building (like advertisement 210*f*), which could reflect the name of the company occupying the building or may also be a poster of some sort applied to the face of a building that may be permanent or temporary (like advertisement 210*g*).

Advertisements may be found in a variety of other mediums in the video game environment 200 such as skywriting, banners that follow behind an airplane (like advertisement 210*f*), or on the actual body of the airplane or a vehicle (e.g., painted on the body or frosted on the glass versus an affixed sign or placard). Certain advertising effects may be achieved through audio advertising over the radio or a loudspeaker or the spoken word of other characters in the video game environment 200.

Advertising 'tags' in a particular asset may reflect not only the space in a game environment 200 where advertising content may be 'inserted' but may also reflect information such as size limitations, coloring and shading requirements, pointers to variables that track state and impression data, functions and programs associated with the advertisement, hyperlinks, mini-games associated with the advertisement, user-profile filters and, in some embodiments, even advertising relevance. Various parties may impose and apply rules and metadata related to the 'tagging' of assets as well as the advertising content that is ultimately inserted into these assets. A further discussion concerning variables and true/false markers as they pertain to various forms of ancillary content is presented in further detail below.

Advertising 'tags' may also be associated with other visual formats such as audio and video. For example, a television in a video game may be 'tagged' as to reflect that the user tuning the television to a particular channel will cause a full motion video advertisement to be streamed. Various other advertisements may be streamed or rendered on additional channels subject to the whim of the game designer and the extent of 'tagging' of assets for advertisement introduction. Similar attributes may be reserved for providing real-time programming and the like (e.g., short films, movie previews and so forth).

Similarly, audio may be 'tagged' for advertising purposes. For example, if a user plays a video game with a radio (e.g., in an automobile), the game designer may create different stations whereby actual music from actual musical artists is played. That music may be interspersed with various advertisements as one might hear over the radio in the real-world. Similarly, the actual music a user listens to may be a dynamic play list as in the case of a real-world radio station instead of a one-time, static soundtrack. In that way, the user may play the game today or five years from now and be able to listen to not only relevant advertisement but relevant music that is current and popular as of the day the user plays the game.

Returning to FIG. 1, the digital environment 100 also includes mediation server 120. Mediation server 120 includes standard computing components such as network and media interfaces, computer-readable storage (memory), and processors for executing instructions that may be stored in memory. Mediation server 120 cooperates with content server 110 to allow for delivery of content—both primary (e.g., video game or movie content) as well as ancillary (e.g., advertisements)—to end-user client devices 140. In some embodiments, the functionalities of multiple servers may be integrated into a single server. Any of the aforementioned (or subsequently referenced) servers or an integrated server may take on certain client-side, cache, or proxy server characteristics. Any particular integration (or lack thereof) may depend on the particular network placement of the server or certain configurations of the server.

Requests for content-related services in digital environment 100 are initially mediated by the mediation server 120. Based on information provided in a request for content from end-user client device 140, the mediation server 120 determines a set of permissions and provides configuration information to the end-user client device 140 to allow for the requested service (i.e., delivery of content) in accordance with the set of permissions and other content settings and limitations as identified by the end-user client device 140.

The set of permissions may be based on market segment information indicated by information included in the request. Market segment may refer to geographic location, region, type of end-client device 140, user information, and various combinations of the foregoing. For example, a particular service option may be available only to users and the corresponding end-user client device 140 in a particular geographic location, which may correspond to region 150A . . . C.

Alternatively, there may be multiple service providers for the requested service or a service provider may be associated with multiple servers or addresses. A particular service provider (e.g., content server 110) is assigned to the end-user client device 140 based on geographic location (e.g., region 150A). The mediation server 120 generates configuration information based on whether the end-user client device 140 is located in a particular region 150A. Alternatively, a service may only be available on certain end-user client devices 140 (e.g., brand, model, or presence of accessory devices) or to users of a certain age. These various classifications may be used in the place of a region 150A . . . C, which might otherwise encompass a certain physically definable locality. That geographic locality may be defined in terms of borders or other means, including Internet Protocol addresses or region coding as might be found in a DVD player.

Mediation server 120 sends the configuration information to the end-user client device 140. Such configuration information may include information regarding an identified service provider (e.g., content server 110), how to communicate with the identified service provider, information regarding the requested service, and service options. Configuration of the end-user client device 140 allows for communication to commence between the end-user client device 140 and service provider (e.g., content server 110). More specifically, such configuration may allow for the requested service to be provided to the end-user client device 140 in accordance with the set of identified permissions.

In addition to configuring the end-user client device 140 to receive the service from the service provider (e.g., content server 110), the configuration information may also determine what information is tracked and reported with respect to activity associated with the service. For example, a service may include advertising for display to a user of the end-user client device 140A. Any activity involving such advertising (e.g., advertisement impressions) may be tracked and reported based on the set of permissions embodied in the configuration information and determined by the mediation server 120. For example, the set of permissions may indicate parameters for tracking and evaluating advertising impressions (e.g., a game character must be within a certain distance or interact with an advertisement for an impression to count), quality factors, reporting parameters (e.g., daily, weekly, monthly, upon request, upon achieving a benchmark), and any combination of the foregoing. The set of permissions may also apply to market segment information (e.g., certain parameters may be associated with a region or classification 150A . . . 150C).

Communications network 130 may be a local, proprietary network (e.g., intranet) and/or may be a part of a larger wide-area network. The network 130 may be a local area network (LAN), which may be communicatively coupled to a wide area network (WAN) such as the Internet. The Internet is a broad network of interconnected computers and servers allowing for the transmission and exchange of Internet Protocol (IP) data between users connected through one or more network service providers. Examples of network service providers are the public switched telephone network, a cable service provider, a provider of digital subscriber line (DSL) services, or a satellite service provider. Communications network 130 allows for communication between the various components of the digital environment 100.

End-user client device 140A . . . C may be one of any number of different electronic client devices such as an electronic gaming system, a general-purpose computer, a set-top box, a Blu-Ray® player, a mobile device, or a display device with network connectivity (e.g., a digital billboard). End-user client device 140A . . . C may be a home entertainment system such as a PlayStation® 3 from Sony Computer Entertainment Inc. End-user client device 140A . . . C may also be a home media center capable of playing, for example, digital video discs (DVDs) or other optical, flash or on-demand media.

End-user client device 140A . . . C may be configured to access data from other storage media, such as memory cards or disk drives as may be appropriate in the case of downloaded content. As such, an end-user client device 140A . . . C is inclusive of any device capable of receiving primary and/or ancillary content over a network or other communications means (e.g., a synchronization operation with another computing device), storing that content locally at the end-user client device 140A . . . C (or at a storage device coupled to the end-user client device 140A . . . C such as flash card memory) and exchanging data with a server configured for such exchanges.

End-user client device 140A . . . C may be associated with a unique device identifier. During a use of the end-user client device 140A . . . C, a user or manager may register (either manually or through an automatic exchange of data over network 130) the end-user client device 140A . . . C (and device identifier) with a database or server. The end-user client device 140A . . . C may be registered and identified thereafter by reference to the device identifier, a corresponding user identifier, or both. The server stores a device identifier, a corresponding user identifier (or identifiers), or both. End-user client device 140A . . . C includes standard computing components such as network and media interfaces, computer-readable storage (memory), and processors for executing instructions that may be stored in memory.

End-user client device 140 may be organized into zones or regions (150A . . . 150C). These regions or zones, as noted above, may be based on physically defined regions such as continents, countries, or even states, and cities so long as the end-user devices 140A . . . C within those zones may be properly assigned to a zone or region. These assignments may be based on information such as network service provider (e.g., certain providers only operate in certain countries), IP addresses, or even a physical address associated with an end-user device 140 as might occur during registration of the device. The zones or regions may alternatively be considered classifications that are not dependent upon a particular geographic definition. In such an instance, the classification may be with respect to gender, age, language, or some other identifiable (either expressly or inherently) characteristic.

Zones 150A . . . C may be defined at the content server 110, mediation server 120, or universe management server 170 as further described below. These definitions may be relevant with respect to ensuring that particular content is delivered to a particular audience. For example, ancillary content that advertises women's hygiene products is likely to be uninteresting for a 12-year old male playing a video game. As such, the service provider associated with content server 110 will want to ensure that its advertising is delivered to those end-user client devices 140 that are associated with females of a certain age. As such, a zone or classification 150 may be developed and applied that corresponds to that particular audience. Content from content server 110 may then be directed to that particular zone or audience. The mediation server 120 may likewise be involved in this process with respect to directing a particular end-user client device 140 to a particular content server 110 for delivery of content, that end-user client device 140 belonging to a particular zone or classification 150.

Information regarding user activity and interaction with a service may be collected at end-user client device 140 and reported to an optional reporting server 160. Reporting server 160 collects the information, which can then be used to generate reports to service providers, including an entity hosting the network environment 100. Reporting server 160 may also collect information directly from service providers such as content server 110. Reported information may include information related to delivery of content, impressions of content experienced at an end-user client device 140, as well information related to deliver and/or impressions from particular zones or classifications 150. The type of information collected and reported may be managed through content or mediation servers 110 and 120 as well as universe manager 170.

Network environment 100 may optionally include a universe management server 170. Universe management server 170 may be a computing device associated with an entity hosting the network environment 100. Through universe management server 170, the host may receive reports from reporting server 160 including the same or additional information as content providers. Universe manager 170 may also be used to reconfigure or change certain settings at the mediation server 120. In some instances, a network environment 100 may include a number of mediation servers 120. Universe manager 170 may assign responsibilities of certain mediation servers 120 to certain regions (150) or otherwise reconfigure mediation server 120 with respect to how it interacts with content server 110. Universe manager 170 may also be used to invoke kill switch functionality or to realign zone configurations 150.

Figure 3A:
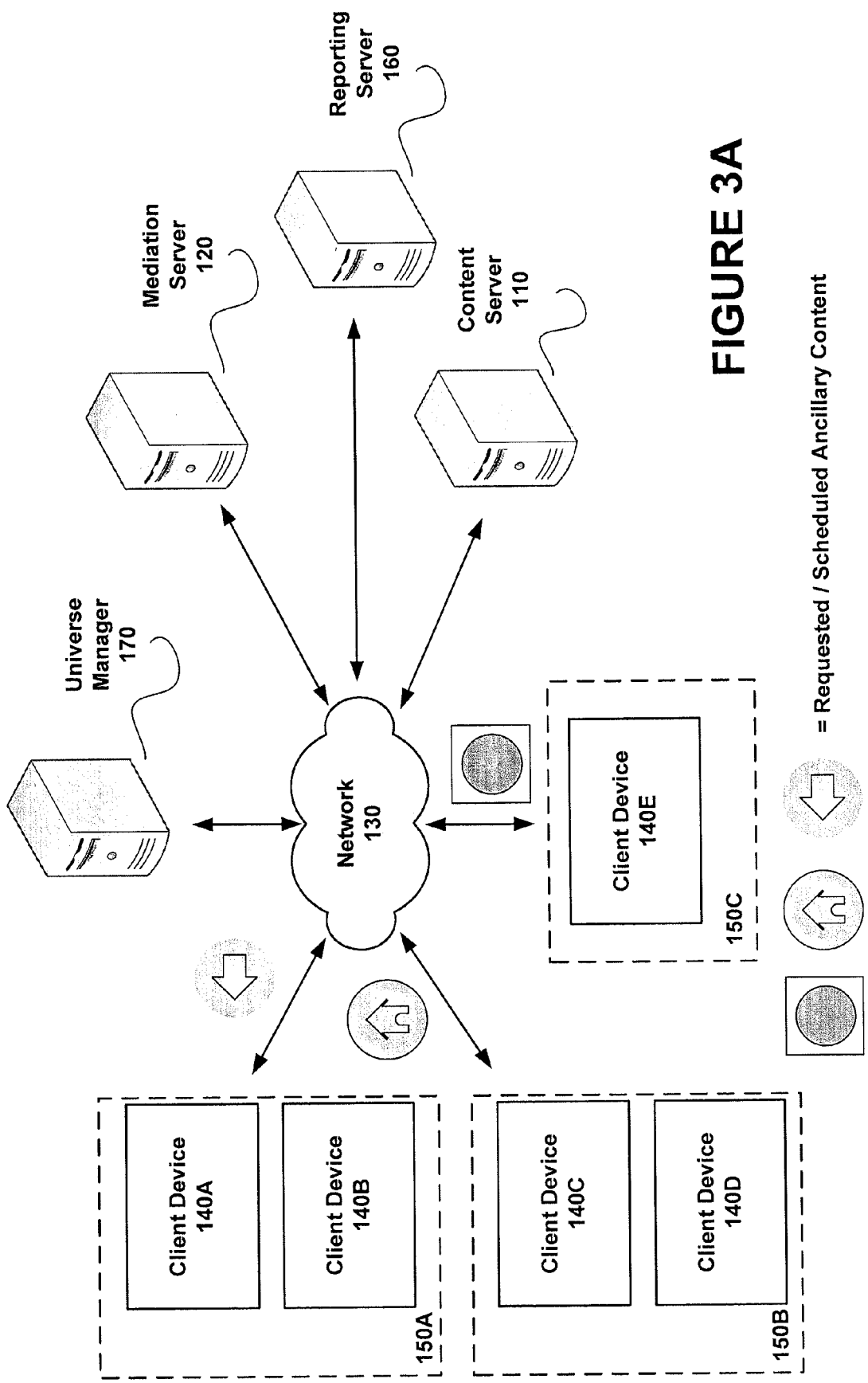
FIG. 3A illustrates a networked digital environment delivering content.

FIG. 3A illustrates a networked digital environment 300 delivering content. The environment 300 of FIG. 3A might otherwise correspond to the environment 100 of FIG. 1. In environment 300, an end-user client device 140 is activated. The end-user client device 140 begins executing a disc embodying content or downloading primary content from a streaming video server or other content provider. During execution, certain code is processed indicating that it will be necessary to bring in ancillary content for insertion into the presentation of content at the end-user client device 140.

In accordance with the processed instructions, the end-user client device 140 will seek to communication with a mediation server 120. As a part of the communication from the end-user client device 140, an indication is made with respect to the nature of the content being displayed at the end-user client device and what type of ancillary content may be required. The mediation server 120 will process this and other provided information to make a determination with respect to which of any number of content servers 110 should be servicing the end-user client device 140.

In some instances, a single content server 110 may provide all content for a particular end-user client device 140 displaying particular digital content. This single content server 110 may be tasked with a particular title or genre of game or movie. Similarly, a content server 110 may be tasked with servicing a particular zone, region, or classification 150 with such classification initially being determined by a mediation server 120 during initial negotiations between the end-user client 140 and the mediation server 120. Some content servers 110, too, may be tasked with providing default content as may be appropriate should a particular advertiser later discontinue an advertising campaign or there is a need to terminate delivery of particular content from a particular content server 110.

Following initial mediation activities between the end-user client 140 and the mediation server 120, the mediation server 120 directs the end-user client 140 to the appropriate content server 110 for delivery of the appropriate elements of content. The mediation server 120 may provide instructions for all potential content downloads or may only provide instructions for a requested set of content downloads. In this regard, the end-user client device 140 may contact the mediation server 120 any number of times during an online session.

The end-user client device 140, after connecting to the appropriate content server 110 as directed by the mediation server 120, then begins to receive content. Content may be specific to a game, to a part of a game, to a user, to a classification of user, to a particular geographic area (e.g., a zone 150), or any combination of the foregoing depending on certain information exchanged by and between the mediation server 120 and end-user client device 140 during mediation. The delivery of content may depend upon the configuration of the end-user client device 140 following mediation with the mediation server 120 with respect to certain permissions as to allowed and prohibited content. Similarly, the end-user client device may be directed to a particular content server 110 tasked with delivering certain content that is not prohibited content.

As shown in FIG. 3A, end-user client 140A and 140B are receiving content from content server 110 with respect to a particular product associated with a particular zone 150A. End-user clients 140C and 140D, however, are receiving certain content from content server 110 based on classification of the user (e.g., under 18) 150B. End-user client 140E is receiving default content as the client device is displaying primary content that is associated with ancillary content that is no longer available (classification 150C).

Figure 3B:
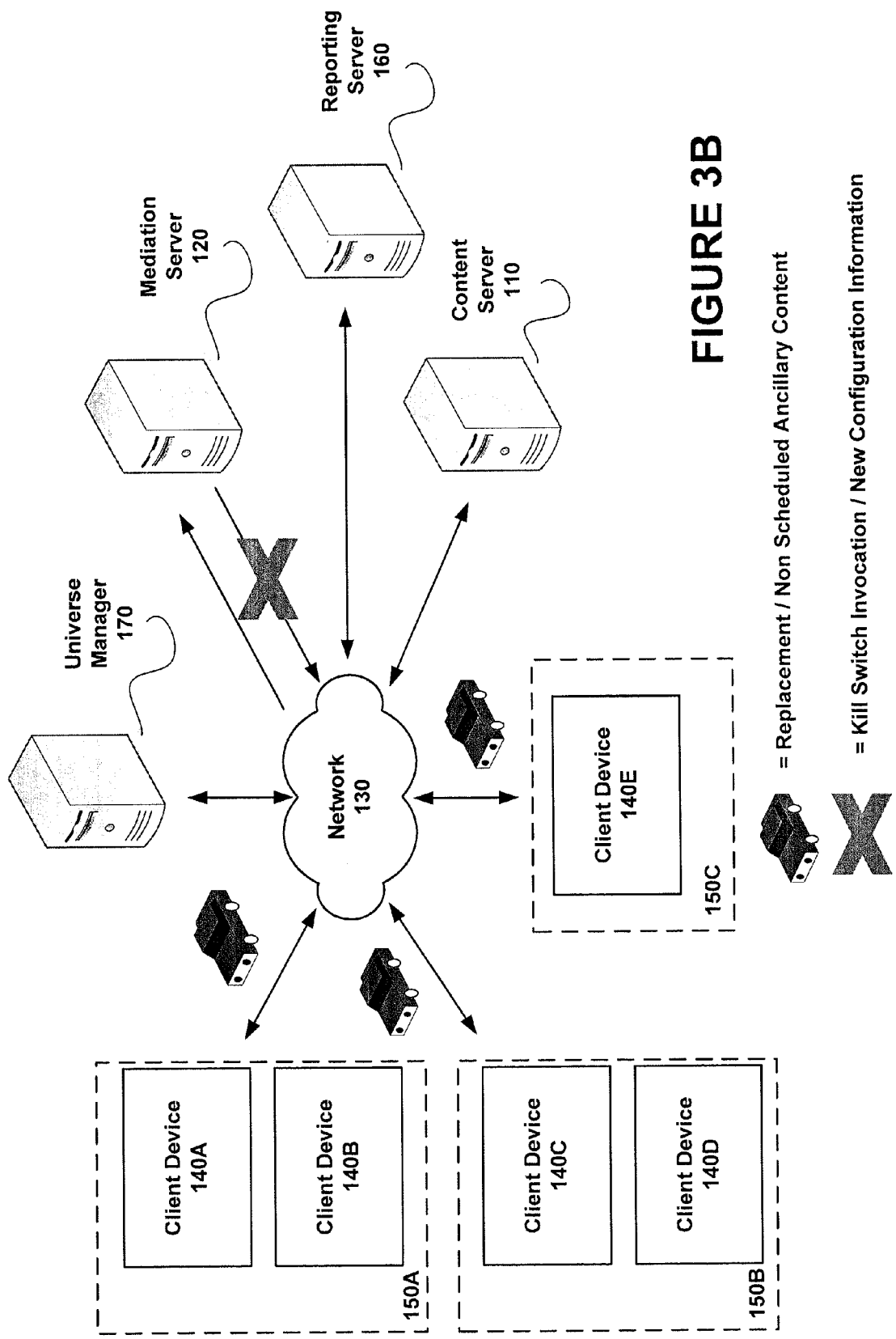
FIG. 3B illustrates the networked digital environment of FIG. 3A following invocation of a kill switch.

FIG. 3B illustrates the networked digital environment of FIG. 3A following invocation of a kill switch. For the sake of clarity, reference to a kill switch is colloquial and refers to functionality and not a physical apparatus although a computing device would ultimately be necessary to invoke kill switch functionality. In some instances, it may be necessary to terminate the delivery of content because of a presentation issue (e.g., the content does not integrate well into a particular environment), a communal sensitivity issue (e.g., particular content might be deemed as offensive), or a legal issue (e.g., the content violates one or more laws of a particular jurisdiction).

In the event a termination of content is necessary, an authorized entity might introduce a command to terminate content delivery (i.e., invoke the kill switch) at the universe manager 170. While cessation of content delivery may occur at the content server 110 by removing the content from a library of available content, the service provider associated with, for example, illegal content may not immediately be aware of the illegality of the content. In such an instance, the operator of the network 100 as a whole—and who might have legal obligations to ensure removal of the content notwithstanding it not being their content—can provide instructions to a mediation server 120 or servers to discontinue directing end-user client devices 140 to a particular content server 110 that is delivery the broken, offending, or illegal content.

Further, and in the interest of removing the content, but still providing a enjoyable gaming experience, it might be necessary to replace the offending content with some temporary replacement content. The content provider, however, may need to seek authorization from the operator of the network to introduce new content. In such an instance, the content provider will need to work in cooperation with the authority operating the universe manager to approve the content and have a mediation server 120 provide proper configuration instructions to an end-user client device 140 to allow for re-direction and subsequent delivery of the replacement content or risk particular advertisement tags as showing up 'blank' or 'empty.'

Figure 4:
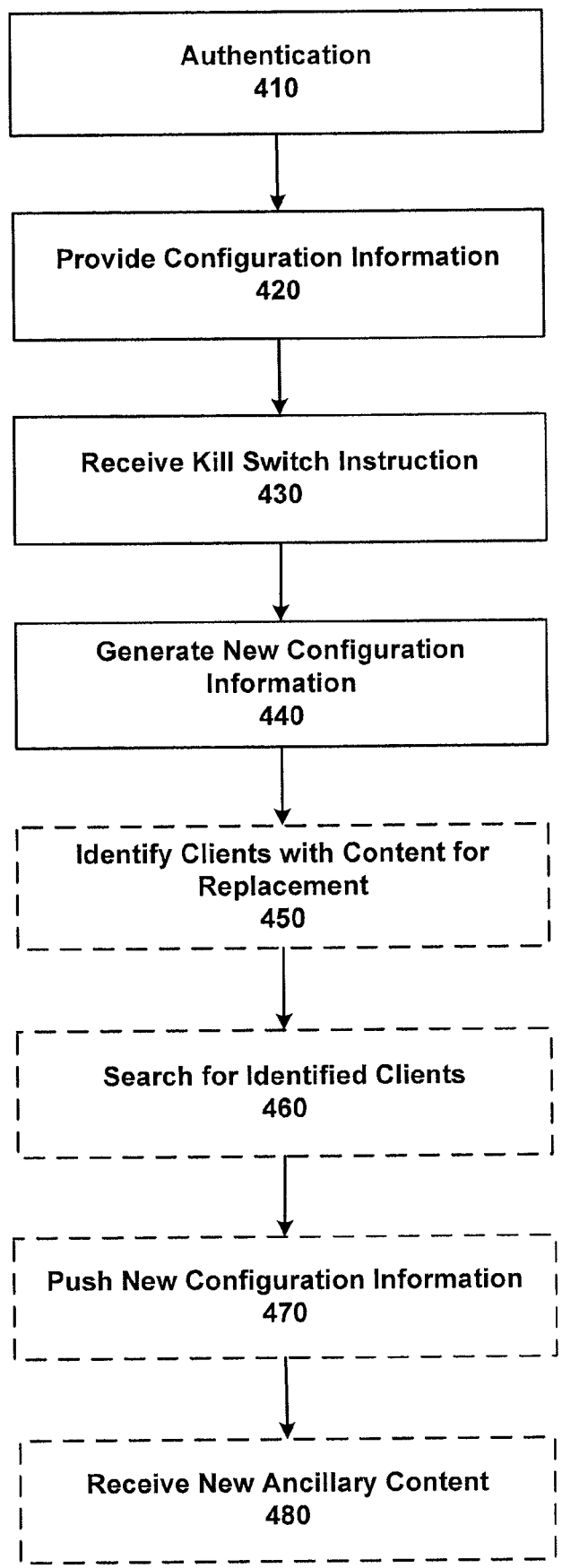
FIG. 4 illustrates a method for management of content in a networked digital environment.

FIG. 4 illustrates a method for management of content in a digital environment 400. In step 410, a mediation server enters into an authentication operation with a communicating end-user client device. As a part of the communication and subsequent authentication operation, the mediation server receives information useful to authentication and mediating the content delivery process. This might include information concerning the identification of the end-user client device, the identity of a user of the end-user client device, particular content being executed by the end-user client device, various permissions concerning access to content, and particular membership or allocation to groups or zones.

The end-user client device might make this initial communication with the mediation server following the local processing of primary content or instructions related to that content that indicate the need to contact the mediation server for additional ancillary content. Information related to contacting the mediation server may be embedded in firmware at the end-user client device or as a part of the executed instructions in a computer-readable storage medium. These instructions or other information might likewise identify what information is to be conveyed to the mediation server.

In step 420, the mediation server provides configuration information to the end-user client device following processing of the information provided by the end-user client device. This configuration information is used by the end-user client device to subsequently contact a service provider delivering content, which may include ancillary advertising content as well as primary content including audio, video, or a combination thereof. The end-user client device, following receipt and execution of this configuration information, contacts the appropriate content server or servers for the requested content.

In step 430, the mediation server receives an instruction to activate kill switch functionality. The kill switch functionality may be implemented through software stored in memory of the mediation server. Upon execution of the software instructions related to kill switch functionality by a processing device, certain content provided over the network may be managed to prevent further delivery and, in some instances, to manage that content already delivered. The instructions to invoke kill switch functionality may be received over a network from the universe manager, directly at the mediation server, or through computing device communicatively coupled to the mediation server and allowing for provisioning of instructions related to invoking the functionality.

In step 440, the mediation server generates new configuration information corresponding to the invocation of kill switch functionality. This new configuration information may be uploaded to the mediation server as part of a complete 'configuration package' meant to address the management of certain information being delivered over the network. The new configuration information may also be generated at the mediation server as part of a software routine that receives certain input related to content requiring termination (e.g., identity of the information, classes of users who should not received the information, IP address of a content server providing the content at issue) and then creates a new configuration set corresponding to the parameters provided as a part of invocation of said functionality.

Following generation of the new configuration information, upon a subsequent request for mediation by an end-user client device, the end-user client will no longer receive configuration information that would allow it to obtain the content whose provisioning is being terminated. For example, if an end-user client is executing a particular video game, the video game may include an asset 'tagged' for insertion of ancillary advertising content. The end-user client would then contact the mediation server, receive configuration information, and then subsequently contact the appropriate content server for delivery of that ancillary content as corresponding to that particular tagged asset. If the content initially associated with that particular asset later is discovered to be undesirable, offensive, or illegal, it will become necessary to terminate delivery of the ancillary content in question.

Following invocation of the kill switch functionality, a second or later mediated end-user client device will receive a new configuration package that may bypass communication with the content server providing the content in question. As a result, the end-user client device will not receive the ancillary content that required invocation of the kill switch. The end-user client device may be directed to another server—a server not having the problematic content—for ancillary content provisioning. If another server is not available, the end-user client may simply be unable to download content and advertising assets are left blank, reflect an error message, or revert to original default content such as a static 'all purpose' advertisement that may be related to the content or producer of the content.

In some instances, however, the content server providing the content at issue may also be responsible for providing other types of content that are not questionable or problematic. In such an instance, the mediation server may provide a configuration package that allows the end-user client device to obtain ancillary content for all other assets, but not for the asset that would otherwise receive the content in question. The asset, in this particular example, may simply be left 'blank' or reflect an error message in that the desired content cannot be downloaded. The asset may also revert to a default ancillary content insertion.

In some instances, a content server may be on 'stand by' for delivery of generic ancillary content at all times in order to allow for insertion of some sort of ancillary content when the originally scheduled content needs to be removed. In this way, a particular gaming experience or digital content viewing experience is not interrupted due to the appearance of a 'blank' asset that would have otherwise received content. The actual content servers may have 'stand by' content at the ready in the event that other ancillary content need be removed.

The new configuration package reflective of invocation of kill switch functionality may also target only specific end-user client devices. For example, a particular advertising message may be appropriate in one country, but illegal in another. In such an instance, the mediation server will identify those end-user client devices originating from a particular country, region, or zone and manage delivery of content—including the non-delivery of the offensive content—as is necessary. The mediation server may operate on varying levels of granularity including by country, by city, by zip code, by IP address, by gender, by age range, by interest, or by any other classification that may allow for organization of end-user client devices into particular zones or classifications.

While new end-user client devices will not receive the ancillary content in question, certain end-user client devices will have previously contacted the content server and received a download of the problematic content. This problematic content may remain at the end-user client device until the end-user client device begins a new communication session with either the mediation server or the content server for new or updated ancillary content. In some instances, the offensive content may reside on the end-user client device for weeks at a time.

In some embodiments, a record may be maintained of what end-user client devices have received what content and when. This information may be maintained by a reporting server operating in conjunction with the content server. A report generated and maintained by the reporting server may be used to by the mediation server to proactively remove offensive or problematic content from an end-user client device.

For example, a reporting server may reflect that five end-user client devices downloaded offensive or illegal ancillary content prior to the kill switch being invoked and delivering a new configuration package that prevented further delivery of the problematic content. The reporting server may identify the five end-user client devices by user name, IP address, or some other means for identifying a particular computing device from amongst all computing devices currently only the network. The reporting server may also identify that while certain devices receive the content, that only a small percentage of those devices (e.g., those in a particular country or associated with a certain age range) need to be addressed with respect to having the content removed. Identification of end-client devices with problematic content may be identified in optional step 450.

In the event that a particular end-user client device with the problematic content is still in the network, the mediation server may proactively contact that end-user client device to provide a new configuration package that would trigger the end-user client device to contact a content server for new content that is not offensive or that otherwise resolved the problem that invoked the need for kill switch functionality. The first part of this operation may occur in optional step 460, whereby the mediation server utilizes a report from reporting server to search for those end-user client devices still on the network.

Identification may occur through a ping generated by the mediation server that queries the end-user client devices as to whether they are still on the network. Identification may also occur through a periodic 'keep alive' pulse that may be generated by either the end-user client device to maintain an open IP connection with one or more computing devices in the network. The 'keep alive' pulse may also be generated by a server providing regular information to the end-user client devices (e.g., related to game play) and similarly needing to maintain an IP connection.

Having identified the clients with problematic content in step 450 and subsequently locating those devices on the network in step 460, the mediation server pushes the new configuration package to the end-user client device in optional step 470. The end-user client device then receives the replacement ancillary content from the content server in optional step 480.

The replacement of content through kill switch functionality may be similar to a normal replacement of 'stale' ancillary content on the end-user client device. For example, a configuration package may normally identify that the end-user client devices needs to contact the content server on a particular schedule to check for new content. Similarly, the game or digital content being executed at the end-user client device and that invoked the initial communication with the mediation server may likewise instruct the end-user client device to contact the mediation server for a new configuration package on a periodic basis. Through kill switch functionality, however, the mediation server delivers the new configuration package notwithstanding a regular or prearranged scheduled that might otherwise be observed by the end-user client device.

In some embodiments, the mediation server may not contact the end-user client device and deliver a new configuration package. In some instance, the content server (in conjunction with the reporting server, which would identify those client devices with problematic content), may proactively push new content to the end-user client device without waiting for a request for new content from the device itself. As such, problematic content may be replaced in the background such that no interruption as to the realism of game play or observation of digital content such as a movie otherwise occurs.

An interface for controlling the interaction and integration of ancillary content in a digital environment may be provided. The interface may be generated through execution of an SDK at a computing device coupled to a content server in the network. Through the use of the SDK and the aforementioned interface, a content developer may control the appearance and/or interaction of content as it appears in the network and at end-user client devices that download the content from the content server.

Through such an interface, a content producer may select any number of variables from a library of available variables as may be obtained by a universe manager or other computing device tasked with provisioning the SDK and subsequent updates and revisions thereto. The SDK, in this regard, may be updated over time with new variables, removal of unpopular or unworkable variable, or to update software routines that are associated with implementing particular variable with respect to any particular piece of content.

Variables for inclusion in an SDK and accompanying interface may include weathering of content such that exposure to the elements may be portrayed (e.g., an outdoor sign exposed to weather), explosions or gunfire whereby content may appear to be damaged from weapon activity, scrolling whereby content may travel across a ticker or similar moving message display, and defacement such as graffiti or slung mud. These variables are exemplary and any number of other variables as may be conceived, authored, and embodied in an SDK may likewise be included.

Other variables such as allowing for popup windows, browser launches, follow up inquiries may also be included. For example, if a particular variable is implemented in an advertisement such as a browser launch, if a user interacts with the content during game play, a browser window may launch concurrent with game play to allow the user to learn more about a product or to obtain a sample of the same. Follow up communications, too, may be delivered to the use through invocation of a follow-up inquiry functionality. Information related to what information is tracked and sent to a reporting server may also be invoked through the interface.

Each variable is controlled through a true/false marker, which may be 'ticked' through interaction with the interface. The content producer may activate or deactivate any one of these different variable through the interface such that the variable is invoked or nullified following delivery to an end-user client device. Content is tied to any invoked or nullified variable once delivered to the end-user client device. New variables may be invoked, however, upon the end-user client device updating or renewing a content package as may occur through a regularly scheduled communication with the content server or as might result from kill switch functionality. For example, certain content may be delivered to users of a particular age with certain statistical tracking activated. This tracking may be illegal although the content itself is valid. Through kill switch functionality, the tracking variable may be deactivated in a subsequent content update or delivery.

Through the same or similar SDK, a content producer may preview their content in the network or a particular content environment before it is delivered. Through utilization of a pre-delivery sandbox, a content producer may have a better idea of what their content will look like in the environment thereby avoiding the need to subsequently update the content or invoke a kill switch functionality if particular content appears particular unappealing such that it works contrary to building and/or maintaining brand identity. The aforementioned sandbox, too, may be used to verify compliance with various legal issues or to allow for quality assurance review with a network host prior to the content actually going live in the network.

The present invention may be implemented in the context a variety of end user client devices. The present methodologies described herein are fully intended to be operable on any of such devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge. The various methodologies discussed herein may be implemented as software and stored in any one of the aforementioned media for subsequent execution by a processor.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The present descriptions are intended to cover such alternatives, modifications, and equivalents as may be included within the spirit and scope of the invention as defined by the appended claims and otherwise appreciated by one of ordinary skill in the art. The steps of various methods may be performed in varying orders while achieving common results thereof. Various elements of the disclosed system and apparatus may be combined or separated to achieve similar results. The scope of the invention should be determined not with reference to the above description, but instead should be determined with reference to the appended claims along with their full scope of equivalents.

What is claimed is:

1. A method for managing ancillary content, the method comprising:

receiving a control parameter concerning the ancillary content, the control parameter specifying a target classification of end-user client devices, wherein the target classification is based on at least one demographic characteristic of a user associated with an end-user client device;

executing instructions stored in memory, wherein execution of the instructions by a processor:
  determines that the end-user client device in a network possesses the specified target classification,
  generates an instruction concerning control of the ancillary content in accordance with the control parameter; and
sending the instruction to the end-user client device determined to be associated with the specified target classification, wherein execution of the instruction by a processor of the end-user client device results in control of the ancillary content in accordance with the control parameter.

2. The method of claim 1, wherein the control of the ancillary content includes designating the end-user client device as unauthorized to access the ancillary content.

3. The method of claim 2, wherein the ancillary content was previously delivered to the end-user client device and wherein designating the end-user client device as unauthorized includes removing the previously delivered ancillary content from a digital environment associated with the end-user client device.

4. The method of claim 2, wherein the ancillary content is not present on the end-user client device and wherein designating the end-user client device as unauthorized includes denying access requests sent from the end-user client device concerning the ancillary content.

5. The method of claim 2, wherein the designation of the end-user client device as unauthorized further applies to new ancillary content designated as being related to the ancillary content in the request.

6. The method of claim 2, further comprising delivering the ancillary content to one or more recipient end-user client devices in the network, wherein delivering the ancillary content includes determining that each recipient end-user client device in the network is authorized to receive the ancillary content.

7. The method of claim 1, wherein the control related to the ancillary content includes a restriction on ability of the end-user client device to conduct operations involving the ancillary content.

8. The method of claim 1, wherein the control related to the ancillary content includes modifying a copy of the ancillary content stored at the end-user client device.

9. The method of claim 1, wherein the control parameter specifies the ancillary content by reference to a tag associated with the ancillary content.

10. The method of claim 9, wherein the control of the ancillary content includes reference to one or more rules, each rule associated with at least one tag.

11. The method of claim 10, wherein the control of the ancillary content includes modifying a rule associated with the tag associated with the ancillary content.

12. The method of claim 9, wherein the control of the ancillary content includes modifying a copy of the ancillary content stored at the end-user client device, wherein at least part of the ancillary content is replaced with replacement ancillary content.

13. A system for managing ancillary content, the system comprising:
  one or more content servers, each content server hosting a store of ancillary content available to one or more end-user client devices in a network comprising a plurality of end-user client devices; and a mediation server that:
: receives a control parameter concerning ancillary content, the control parameter specifying a target classification of end-user client devices, wherein the target classification is based on at least one demographic characteristic of a user associated with an end-user client device,
: determines that the end-user client device in the network possesses the specified target classification,
: generates an instruction concerning control of the ancillary content in accordance with the control parameter, and
: sends the instruction to the end-user client device determined to be associated with the specified target classification, wherein execution of the instruction by a processor of the end-user client device results in control of the ancillary content in accordance with the control parameter.

14. The system of claim 13, wherein the mediation server further:
: receives a request from an end-user client device in the network, the request concerning content;
: authenticates the end-user client device as authorized to access the requested content; and
: directs the end-user client device to connect to one of the content servers hosting the requested content, wherein the requested content is made accessible to the authorized end-user client device.

15. The system of claim 13, wherein the mediation server further:
: receives a request from an end-user client device in the network, the request concerning ancillary content hosted at one of the content servers;
: determines that an end-user client device in the network is not authorized to access the requested content; and
: denies the request for access to the requested content.

16. The system of claim 15, wherein the mediation server redirects the end-user client device to replacement ancillary content hosted by one of the content servers.

17. The system of claim 13, wherein the mediation server further responds to the control parameter by removing the specified ancillary content from the one or more content servers.

18. The system of claim 13, wherein the mediation server further responds to the control parameter by designating the end-user client device as unauthorized to access the specified ancillary content.

19. The system of claim 13, further comprising:
: at least one other mediation server; and
: a universe management server that assigns responsibilities among the mediation server and the at least one other mediation server.

20. The system of claim 19, wherein the universe management server further modifies a rule enforced by one of the mediation servers.

21. The system of claim 19, the universe management server further:
: receives a request from an authorized entity specifying ancillary content;
: generates the control parameter based on the received request; and
: sends the control parameter to the mediation server.

22. A non-transitory computer-readable storage medium, having embodied thereon a program, the program including instructions executable to perform a method for managing ancillary content, the method comprising:
: receiving a control parameter concerning the ancillary content, the control parameter specifying a target classification of end-user client devices, wherein the target classification is based on at least one demographic characteristic of a user associated with an end-user client device;
: determining that the end-user client device in a network possesses the specified target classification;
: generating an instruction concerning control of the ancillary content in accordance with the control parameter; and
: sending the instruction to the end-user client device determined to possess the specified target characteristic, wherein execution of the instruction by a processor of the end-user client device results in control of the ancillary content in accordance with the control parameter.

* * * * *